United States Patent
Mansour et al.

(10) Patent No.: US 9,363,748 B1
(45) Date of Patent: Jun. 7, 2016

(54) ACCESS LATENCY REDUCTION

(75) Inventors: Nagi A. Mansour, Arlington, VA (US); Kafi I. Hassan, Fairfax, VA (US); Nawara Omary, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 437 days.

(21) Appl. No.: 13/551,358

(22) Filed: Jul. 17, 2012

(51) Int. Cl.
*H04W 52/00* (2009.01)
*H04W 52/02* (2009.01)

(52) U.S. Cl.
CPC ............. *H04W 52/00* (2013.01); *H04W 52/02* (2013.01); *H04W 52/0219* (2013.01)

(58) Field of Classification Search
CPC ...... H04W 24/00; H04W 52/46; H04L 43/50; H04L 43/0852; H04L 43/08; H04L 41/12; H04L 45/02; H04L 45/04; H04L 41/04; H04B 17/003; H04B 7/18543; H04B 7/2045; H04B 7/208
USPC ........... 370/252, 254, 318, 319, 913; 455/522
See application file for complete search history.

(56) References Cited

U.S. PATENT DOCUMENTS

| | | | |
|---|---|---|---|
| 7,720,038 B2 * | 5/2010 | Bennett ......................... | 370/338 |
| 8,489,137 B1 * | 7/2013 | Mistry et al. .................. | 455/522 |
| 8,526,990 B1 * | 9/2013 | Pulugurta ............. | H04W 52/04 |
| | | | 455/522 |
| 2006/0014557 A1 * | 1/2006 | Rajkotia et al. ............... | 455/522 |
| 2007/0149235 A1 * | 6/2007 | Chin et al. ..................... | 455/522 |
| 2009/0054096 A1 * | 2/2009 | Single ................. | H04W 52/325 |
| | | | 455/509 |
| 2013/0130738 A1 * | 5/2013 | Cherian ............. | H04W 52/228 |
| | | | 455/522 |

* cited by examiner

*Primary Examiner* — Mang Yeung
*Assistant Examiner* — Natali N Pascual Peguero

(57) ABSTRACT

Wireless device information comprising a power level of a successful access probe sent by wireless devices to an access node and a location of each of the wireless devices relative to the access node is acquired. Based on the wireless device information, a first access probe power level is determined. The determined first access probe power level is provided to a new wireless device and an access probe is received from the new wireless device using the first access probe power level.

20 Claims, 6 Drawing Sheets

ACCESS LATENCY REDUCTION

TECHNICAL BACKGROUND

A wireless device can initially attempt to establish communication with a communication network through an access node or access point. One method of establishing communication with an access node is through an initial communication signal, such as an access probe. In interconnect calls (which are typically full-duplex communication) a call setup duration of several seconds is typically acceptable to users. For push-to-talk calls (which are typically half duplex communication) call setup duration is typically substantially shorter than for interconnect calls.

OVERVIEW

Wireless device information is acquired from wireless devices in communication with an access node. The wireless device information can comprise a power level of a successful access probe and a location of each of the wireless devices relative to the access node. Based on the wireless device information, a first access probe power level is determined. The determined first access probe power level is provided to a new wireless device, and an access probe is received from the new wireless device using the first access probe power level.

DETAILED DESCRIPTION

Figure 1:
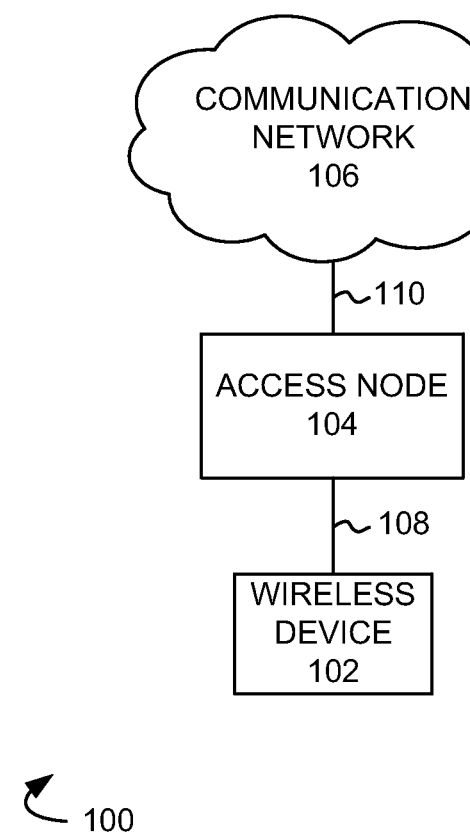
FIG. 1 illustrates an exemplary system for network communication.

FIG. 1 illustrates an exemplary communication system 100 to process a call request comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 through communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 through communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Figure 2A:
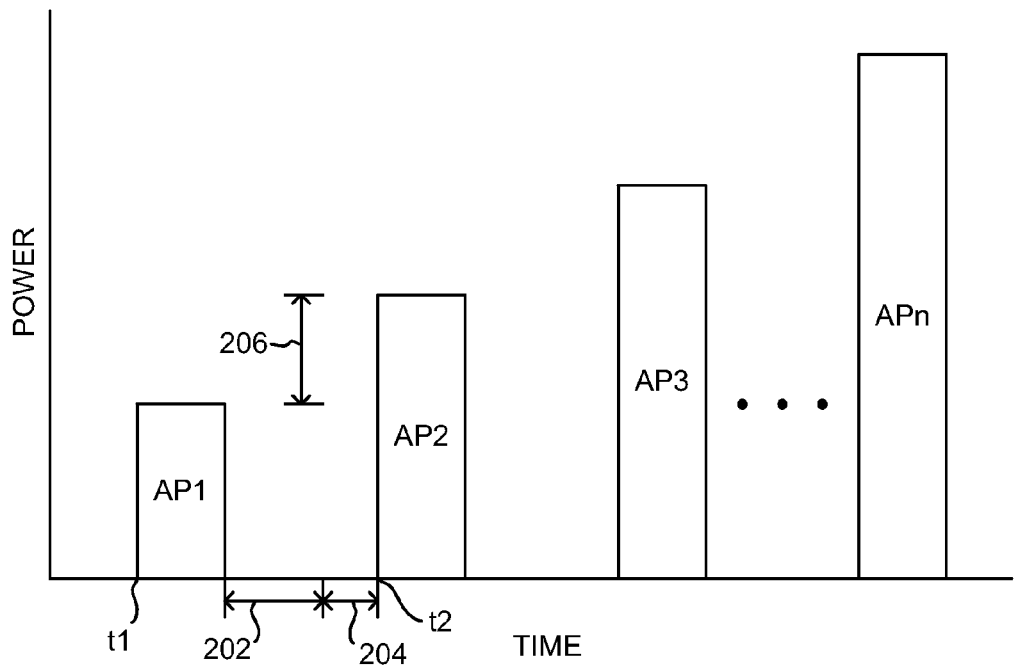
FIG. 2A illustrates exemplary access probe power levels.

When a wireless device attempts to access a communication system, the wireless device may use access probes (each access probe typically comprising a short message) to attempt to establish communication with the communication system. The wireless device can send more than one access probe, for example, using an access channel over communication link (such as a reverse link over a communication link). FIG. 2A illustrates exemplary access probes which can be sent by a wireless device attempting to establish communication with an access node. At a first time t1, a first access probe AP1 can be sent by a wireless device at a first power level. The transmission of the first access probe can be followed by a period of time 202 during which the wireless device waits for an acknowledgement message from an access node. Time period 202 can be followed by a second time period 204, a time period of random length which can serve as a backoff time to add additional time between access probes, though the second time 204 period is not required. When the wireless device does not receive an acknowledgment message from the access node in response to access probe AP1, at a second time t2 the wireless device can send a second access probe AP2 at a second power level higher than the first power level. The second power level is typically larger than the first power level by a step 206. After access probe AP2 is sent, the wireless device can wait for a response from the access node, and can also add an additional time period when a response is not received. The wireless device can send subsequent access probes AP3 . . . APn, each at a greater power level, until the wireless device receives an response from the access node, or until a predetermined number of access probes (n) are sent without a response from the access node.

Sending access probes in this manner can introduce delay in establishing communication between a wireless device and an access node. For example, if a time period between each access probe illustrated in FIG. 2A is approximately 250 ms, and if a fourth access probe is successful, then approximately 750 ms of delay is introduced into the process of establishing communication between the wireless device and the access node by the sending of three unsuccessful access probes. Such additional delay can degrade the performance of the communication system.

In an embodiment, wireless device information comprising power levels of successful access probes is acquired from wireless devices in communication with access node 104. A successful access probe is an access probe which when received at access node 104 leads to the granting of access to communication network 106 to a wireless device. Based on the wireless device information acquired, a first access probe power level is determined. That is, the first access probe power level is determined based at least in part on the acquired power levels of the successful access probes. The determined first access probe power level is provided to a new wireless device, such as wireless device 102. An access probe using the first access probe power level is received from wireless device 102. In an embodiment, the use of the first access probe power level in the access probe enables the access probe to be a successful access probe.

Figure 2B:
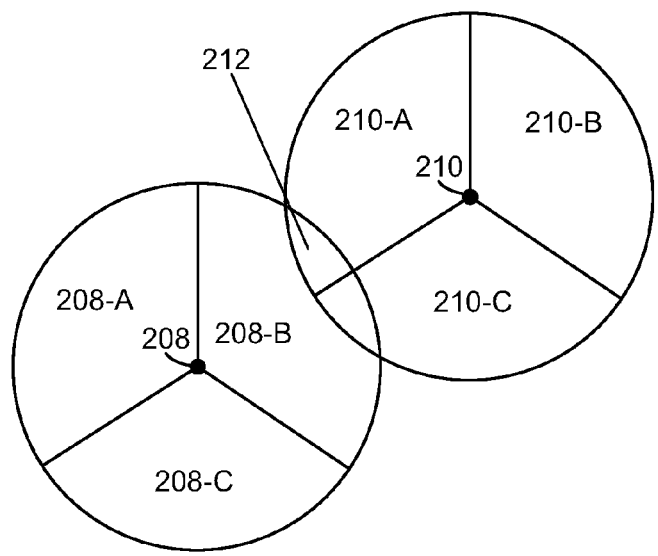
FIG. 2B illustrates exemplary access nodes and sectors.

In an embodiment, a first access probe power level can be determined for a sector of an access node. For example, FIG. 2B illustrates access nodes 208 and 210. Access node 208 is illustrated with three sectors, 208-A, 208-B and 208-C, and access node 210 is illustrated with three sectors, 210-A, 210-B and 210-C. A first access probe power level can be determined, for example, for a sector of an access node, such as sector 208-A, and a different first access probe power level can be determined, for example, for sector 208-B. Similarly, a different first access probe power level can be determined, for example, for sectors 210-A and 210-B of access node 210. A wireless device within range of more than one access node can receive a first access probe power level from more than one access node. For example, a wireless device located in area 212 can receive a first access probe power level of sector 208-B, and of sector 210-A. In addition, a first access probe power level can be determined for an area within a sector of an access node, for example, to address geographical or topological variations, or sources of signal interference, or other conditions which may cause a higher or lower first access probe power level than an adjacent area within a sector of an access node.

In an embodiment, a first access probe power level can be determined for a plurality of access nodes in a geographic area. For example, a first access probe power level can be determined for access nodes 208 and 210. Furthermore, the first access probe power level can be provided to a new wireless device in a coverage area of either or both of access nodes 208 and 210. A first access probe power level can also be determined for only one of access nodes 208 and 210.

Figure 3:
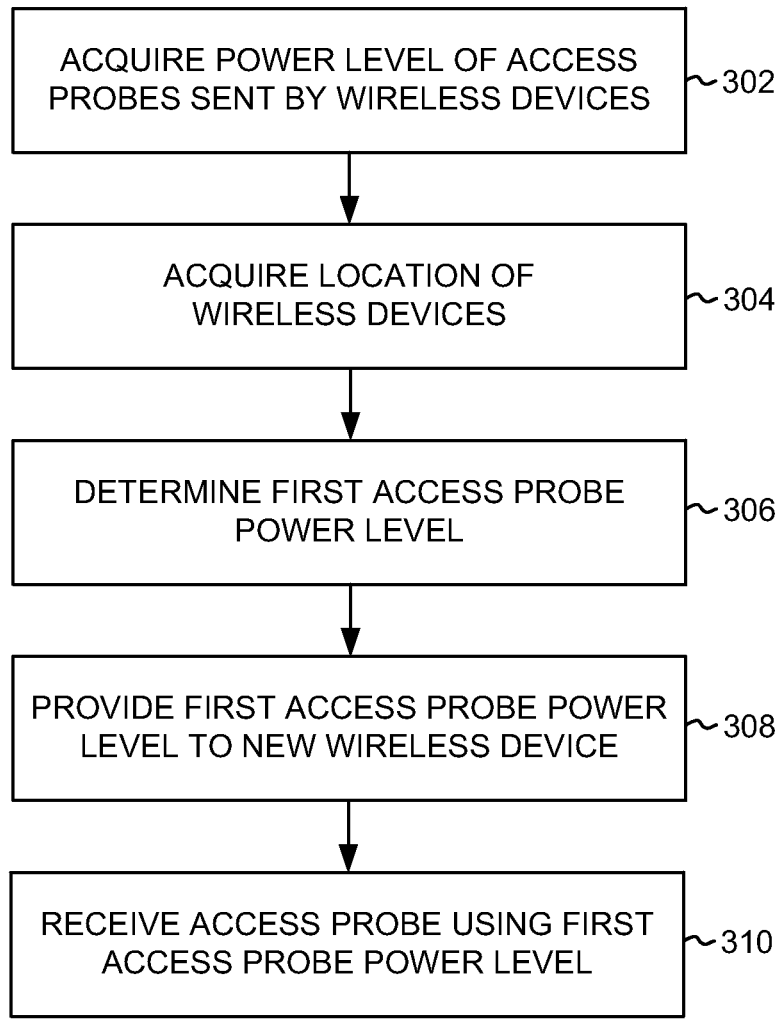
FIG. 3 illustrates an exemplary method of network communication.

FIG. 3 illustrates an exemplary method of network communication. In operation 302 the power levels of successful access probes sent to an access node are acquired, and in operation 304 the locations of wireless devices when they sent the successful access probes are acquired. That is, in operations 302 and 304, wireless device information is acquired. In an embodiment, based on the wireless device information, correlations can be determined between wireless device location and power levels of successful access probes.

In operation 306, a first access probe power level is determined. The first access probe power level can be, for example, a power level which can be used by a wireless device at a location to send a first access probe such that the first access probe will tend to be a successful access probe.

In operation 308, the first access probe power level is provided to a new wireless device. For example, wireless device 102 can be a new wireless device which is powered on within range of access node 104, or which enters a coverage area of access node 104. Wireless device 102 can be provided a first access probe power level by access node 104, for example, in a signal from access node 104. The first access probe power level can depend on the location of wireless device 102. Access node 104 can provide the first access probe power level in a pilot channel (such as a common pilot indicator channel or a primary common pilot channel). Access node 104 can provide the first access probe power level in a control channel (such as a broadcast control channel or a common control channel). Other signals from access node 104 can also be used to provide the first access probe power level to wireless device 102. In an embodiment, the first access probe power level can be a plurality of power levels corresponding to locations in a coverage area of access node 104. In an embodiment, wireless device 102 can provide a location to access node 104, or a distance or range between wireless device 102 and access node 104, and access node 104 can respond with a first access probe power level. In an embodiment, access node 104 can determine a location of wireless device 102, or a distance or range of wireless device 102 from access node 104, and can provide a first access probe power level based on the determined location, distance and/or range of wireless device 102.

In operation 310, an access probe is received using the first access probe power level. For example, an access probe can be received from wireless device 102 at access node 104 which is sent at the first access probe power level. By using the first access probe power level as the power level of the access probe, the first access probe sent by wireless device 102 will tend to be a successful access probe and enable wireless device 102 to establish communication with communication system 100 with decreased delay.

Figure 4:
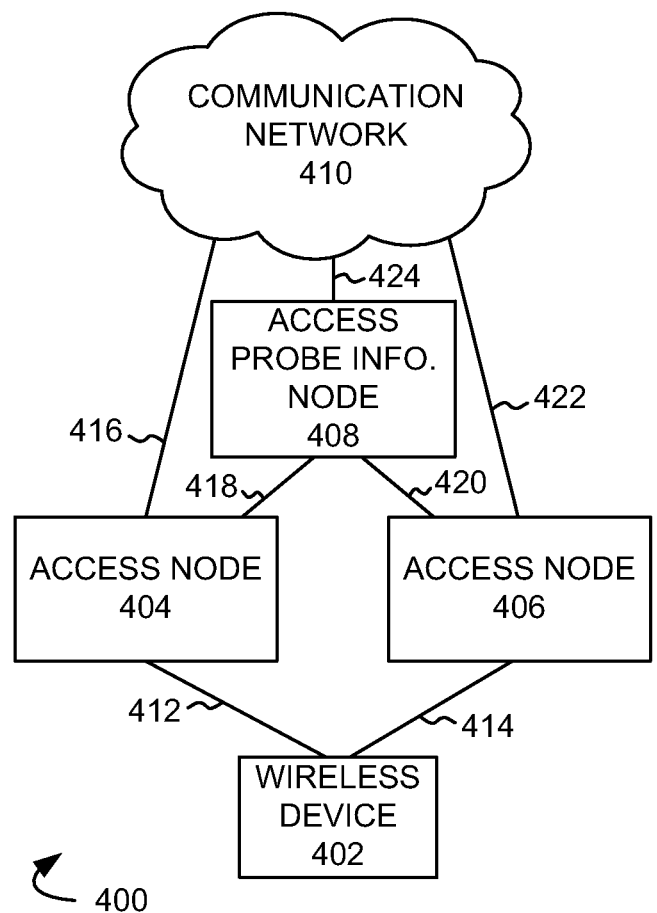
FIG. 4 illustrates another exemplary system for network communication.

FIG. 4 illustrates another exemplary system 400 for network communication comprising wireless device 402, access node 404, access node 406, access probe information node 408, and communication network 410. Examples of wireless device 402 can include a cell phone, a smart phone, a computing platform such as a laptop, palmtop, or tablet, a personal digital assistant, or an internet access device, including combinations thereof. Wireless device 402 can communicate with access node 404 over communication link 412 and with access node 406 over communication link 414.

Access node 404 and access node 406 are network nodes capable of providing wireless communications to wireless device 402, and can be, for example, a base transceiver station, a radio base station, an eNodeB device, or an enhanced eNodeB device. Access node 404 is in communication with communication network 410 over communication link 416 and with access probe information node 408 over communication link 418. Access node 406 is in communication with communication network 410 over communication link 422 and with access probe information node 408 over communication link 420.

Access probe information node 408 is a network element in communication with access nodes 404 and 406, as well as with communication network 410 over communication link 424. Access probe information node 408 can comprise a processor and associated circuitry to execute or direct the execution of computer-readable instructions. Access probe information node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Examples of access probe information node 408 can include a network node or other network element. The functionality of access probe information node 408 can also be included in or together with another network element.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 may also comprise base stations, wireless communication nodes, telephony switches, internet routers, network gateways, computer systems, communication links, or some other type of communication equipment, and combinations thereof. Communication network 410 can use wired and/or wireless communication protocols analogous to communication network 106.

Communication links 412, 414, 416, 418, 420, 422 and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 404 and 406, access probe information node 408, and communication network 410 which are omitted for clarity, including additional processing nodes, routers, gateways, and physical and/or wireless data links for carrying data among the various network elements.

Figure 5:
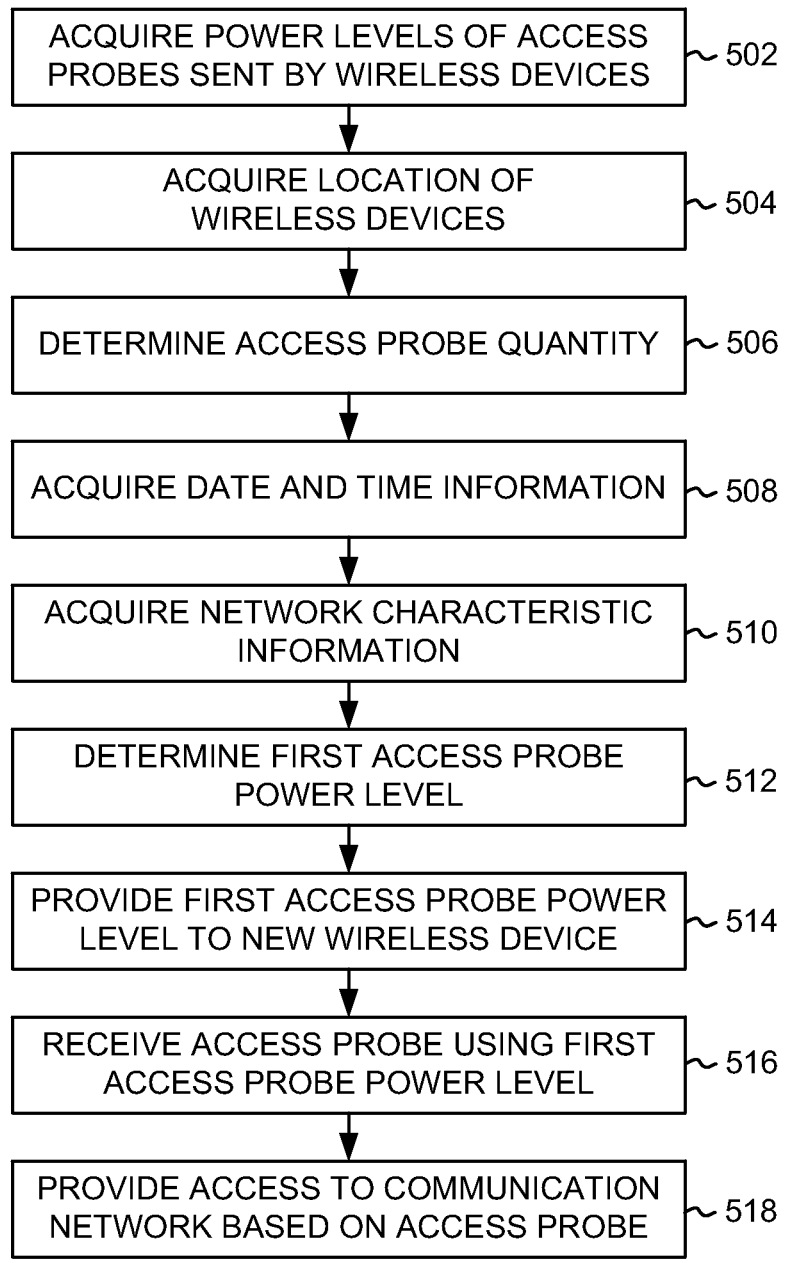
FIG. 5 illustrates another exemplary method of network communication.

FIG. 5 illustrates another exemplary method of network communication. In operation 502 power levels of access probes sent by wireless devices to an access node is acquired. For example, power levels of access probe received by access nodes 404 and/or 406 can be acquired. In operation 504, a location of the wireless devices which sent the access probes can also be acquired. In an embodiment, the power level of successful access probes and locations of wireless devices which sent the successful access probes comprise wireless device information, which can be acquired by, for example, access probe information node 408. In an embodiment, the wireless device information can be determined based on access probes sent by the wireless devices to an access node.

In operation 506, an access probe quantity is determined. For example, when wireless devices attempt to establish communication with access node 404 (or 406) the wireless devices can each send more than one access probe, until a successful access probe is received by access node 404 and/or 406. The quantity of access probes sent by each wireless device can be determined. In an embodiment, an access probe can comprise counter information which can indicate a number of access probes previously sent, if any. For example, if a wireless device sends a first unsuccessful access probe, a second unsuccessful access probe, and a third successful access probe, the third access probe can include an indication that it is the third access probe, and/or that two other access probes were previously sent.

In operation 508, date and time information related to the access probe information can be acquired. For example, a date and time at which an access probe is sent from a wireless device can be acquired. Using date and time information related to the access probe information can enable access probe power levels to be related to times and dates of access probe transmission. Such correlations can provide an indication of an effect on access probe power levels from, for example, times of day when there is heavy network traffic, or dates on which greater network traffic may occur.

In operation 510, network characteristic information related to the access probe information can be acquired. Network characteristics can comprise, for example, radio frequency conditions of a wireless communication link between wireless devices and access node 404 or 406. Network characteristics can also include an indication of radio frequency interference or other conditions tending to degrade signal quality or signal strength. Network characteristics can also include an indication that wireless communications links of an access node are congested.

In operation 512, a first access probe power level is determined based on the wireless device information. In an embodiment, the first access probe power level can also be determined based on at least one of the determined access probe quantity, the date and time information related to the access probe information, and the network characteristic information related to the access probe information. For example, a first access probe power level can be determined for a wireless device at a particular location which may send an access probe at a particular date and time, and in determined network conditions.

In operation 514, the first access probe power level is provided to a new wireless device. For example, wireless device 402 can be a new wireless device which, for example, is powered on within range of access node 404 and/or 406, or which enters into a coverage area of access node 404 and/or 406. Wireless device 402 can be provided a first access probe power level by access node 404 and/or 406. The first access probe power level can depend on the location of wireless device 402, as well as at least one of the determined access probe quantity, the date and time information related to the access probe information, and the network characteristic information related to the access probe information. An access node can provide the first access probe power level, for example, in a pilot channel (such as a common pilot indicator channel or a primary common pilot channel), or in a control channel (such as a broadcast control channel or a common control channel).

In operation 516, an access probe is received from wireless device 402 using the first access probe power level. Based on the received access probe, wireless device 402 can be provided access to communication network 410 through access node 404 or 406 (operation 518).

In an embodiment, access probe information node 408 can acquire locations of wireless devices which send access probes to access nodes 404 and 406 as well access probe quantities sent by the wireless devices. In addition, access probe information node 408 can also acquire date and time information related to the access probe information and network characteristic information related to the access probe information. Based on the locations of the wireless devices and power levels of access probes sent by the wireless devices, as well as at least one of the determined access probe quantity, the date and time information related to the access probe information, and the network characteristic information related to the access probe information, a first access probe power level can be determined. Access probe information node 408 can also provide the first access probe power level for broadcast, for example, by access nodes 404 and 406 to a new wireless device. Thus, the first access probe power level can vary, for example, depending on the location of a wireless device, or on the time of year, or time of day, or on network conditions or characteristics. Accordingly, the number of access probes required from a wireless device to initiate communication with an access node can be reduced.

Figure 6:
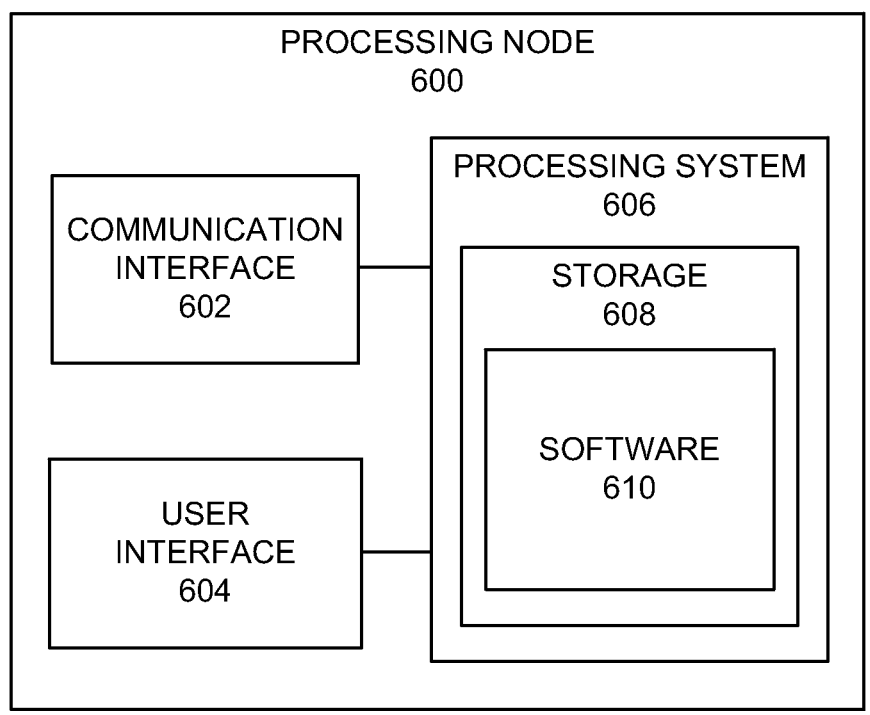
FIG. 6 illustrates an exemplary processing node.

FIG. 6 illustrates an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access probe information node 408. The functionality of processing node 600 can also be included in a network such as access node 104, 404 or 406. Processing node 600 can also be another network element, or an adjunct or component of another network element, in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of network communication, comprising:
    acquiring from wireless devices in communication with an access node wireless device information comprising a power level of a successful access probe and a location of each of the wireless devices relative to the access node, wherein the wireless devices that transmitted each successful access probe are granted access to a communication network based on the successful access probes;
    determining a first access probe power level for a new wireless device not in communication with the access node based on the acquired power levels and the acquired locations;
    providing the first access probe power level to the new wireless device within range of the access node; and
    receiving from the new wireless device an access probe using the first access probe power level.

2. The method of claim 1, wherein determining a first access probe power level further comprises determining a first access probe power level for a sector of the access node.

3. The method of claim 1, wherein determining a first access probe power level further comprises determining a first access probe power level for one access node of a plurality of access nodes.

4. The method of claim 1, wherein determining a first access probe power level further comprises determining a first access probe power level for a plurality of access nodes in a geographic area.

5. The method of claim 1, wherein the wireless device information is based on access probes sent by wireless devices during a registration process with the access node.

6. The method of claim 1, further comprising:
    determining an access probe quantity sent by the wireless devices; and
    determining a first access probe power level based on the wireless device information and the access probe quantity.

7. The method of claim 6, further comprising:
    acquiring network characteristic information related to the wireless device information; and
    determining a first access probe power level based on the wireless device information and the network characteristic information.

8. The method of claim 1, further comprising:
    acquiring time and date information related to the wireless device information; and
    determining a first access probe power level based on the access probe information and the time and date information.

9. The method of claim 1, wherein the first access probe power level is determined such that the access probe received from the new wireless device is successful and the new wireless device is granted access to the communication network based on the successful access probe.

10. A method of network communication, comprising:
    acquiring from wireless devices in communication with an access node wireless device information comprising a power level of a successful access probe and a location of each of the wireless devices relative to the access node, wherein the wireless devices that transmitted each successful access probe are granted access to a communication network based on the successful access probes;
    broadcasting access probe power level information comprising a first access probe power level determined based on the acquired power levels and the acquired locations to a new wireless device not in communication with the access node;
    receiving an access probe from the new wireless device using the access probe power level information; and
    providing access to a communication network based on the access probe.

11. The method of claim 10, wherein the access probe power level information is further determined based on time and date information related to the wireless device information.

12. The method of claim 10, wherein the access probe power level information is further determined based on an access probe quantity related to the wireless device information.

13. The method of claim 10, wherein the access probe power level information is further determined based on network characteristic information related to the wireless device information.

14. The method of claim 10, wherein the access probe power level information is determined for a sector of an access node.

15. The method of claim 10, wherein the access probe power level information is determined for a plurality of access nodes in a geographic area.

16. The method of claim 10, wherein acquiring from wireless devices in communication with the access node wireless device information further comprises acquiring the wireless device information at the access node.

17. A system for network communication, comprising:
    an access node; and
    a processing node configured to:
    acquire from a plurality of wireless devices in communication with the access node wireless device information comprising a power level of a successful access probe and a location of each of the wireless devices relative to the access node, wherein the wireless devices that transmitted each successful access probe are granted access to a communication network based on the successful access probes;
    determine a first access probe power level for a new wireless device not in communication with the access node based on the acquired power levels and the acquired locations; and
    provide the first access probe power level to the new wireless device within range of the access node.

18. The system of claim 17, wherein the processing node is further configured to:
    determine an access probe quantity sent by the wireless devices; and
    determine a first access probe power level based on the wireless device information and the access probe quantity.

19. The system of claim 18, wherein the processing node is further configured to:
    acquire network characteristic information related to the wireless device information; and
    determine a first access probe power level based on the wireless device information and the network characteristic information.

20. The system of claim 19, wherein the processing node is further configured to:
    acquire time and date information related to the wireless device information; and
    determine a first access probe power level based on the access probe information and the time and date information.

* * * * *